Aug. 11, 1953   W. S. CLOUD   2,648,297
METHOD AND APPARATUS FOR THE MANUFACTURE OF CANDY
Filed Nov. 10, 1950   3 Sheets-Sheet 2
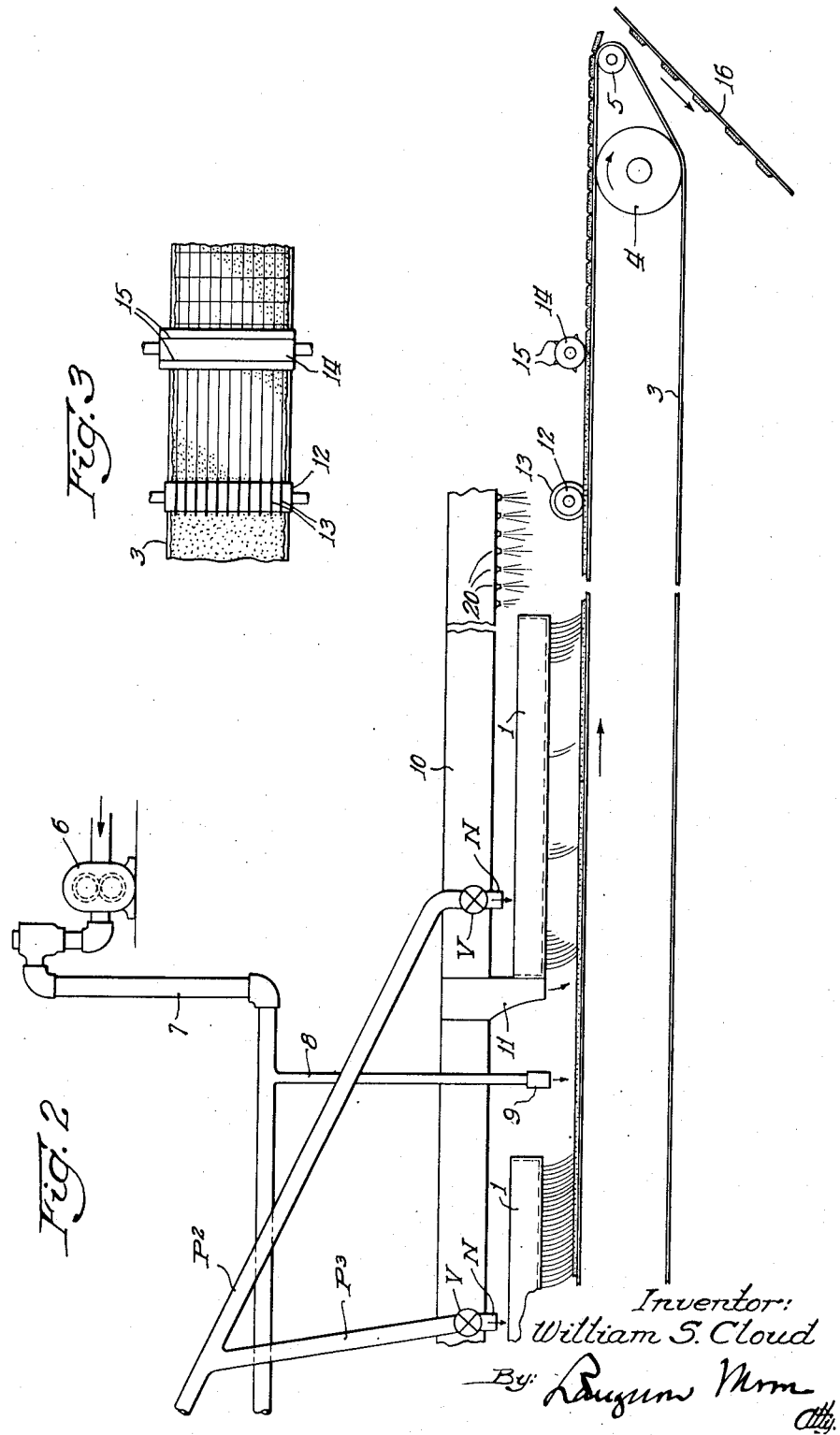
Inventor:
William S. Cloud
By: [signature]
Atty.

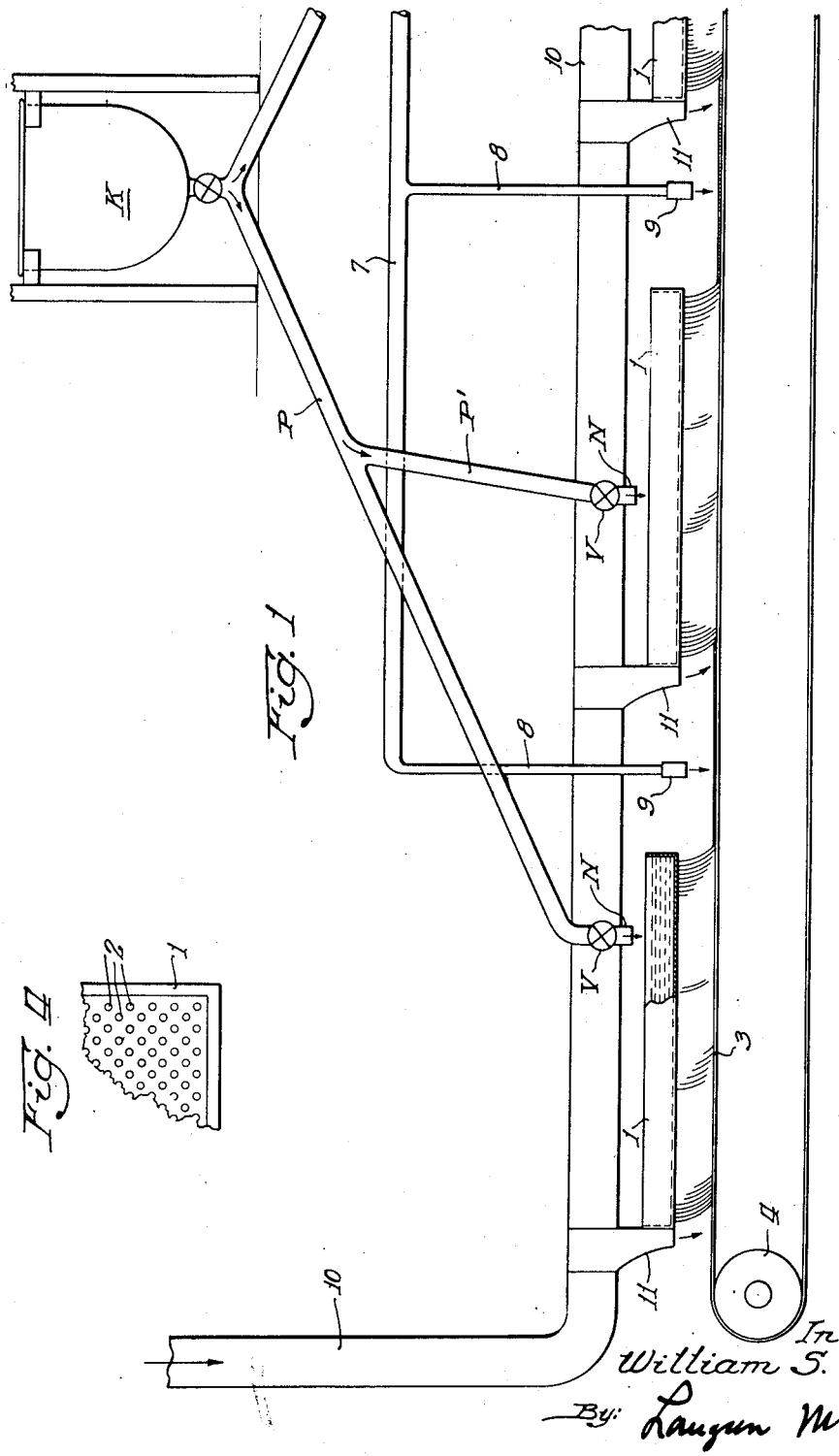

Aug. 11, 1953 W. S. CLOUD 2,648,297
METHOD AND APPARATUS FOR THE MANUFACTURE OF CANDY
Filed Nov. 10, 1950 3 Sheets-Sheet 3
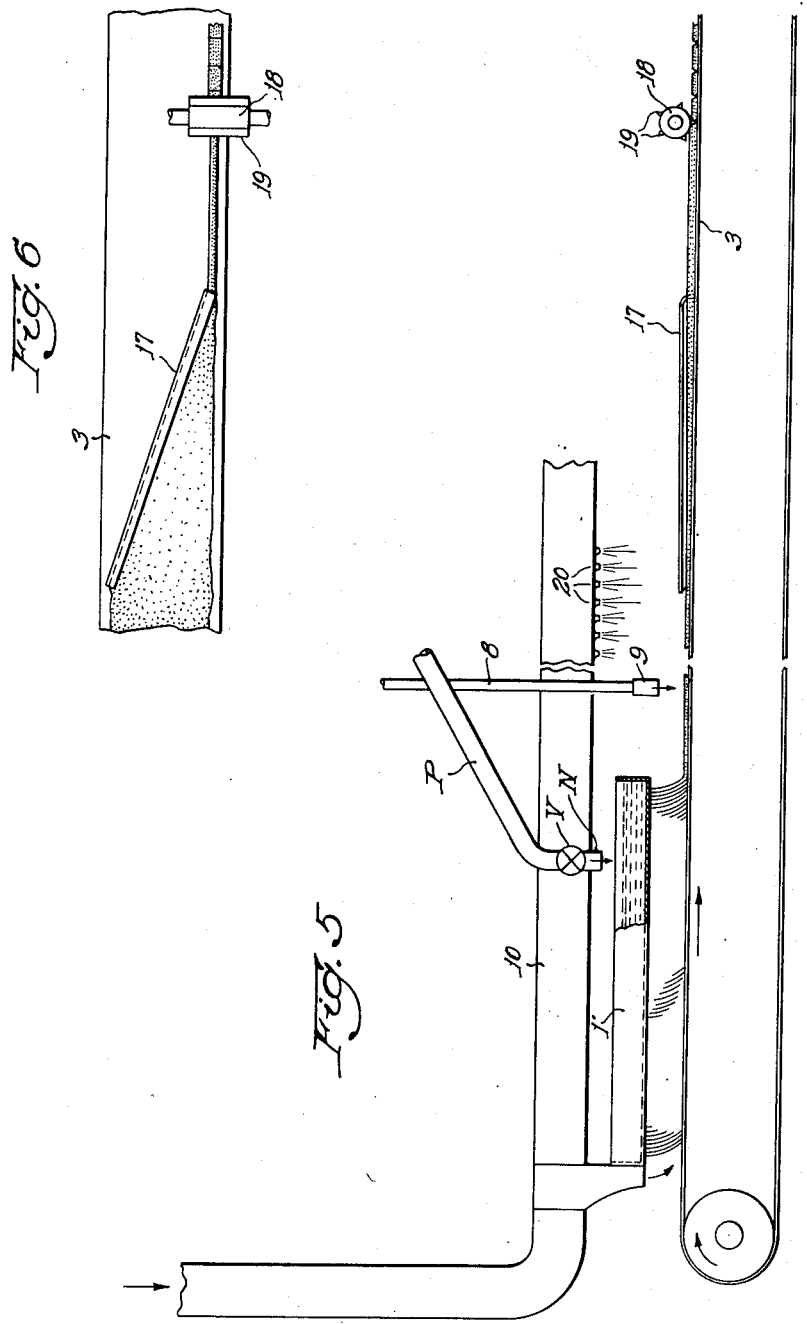
Inventor:
William S. Cloud
By: Langner Mumm
Atty

Patented Aug. 11, 1953

2,648,297

UNITED STATES PATENT OFFICE 2,648,297

METHOD AND APPARATUS FOR THE MANUFACTURE OF CANDY

William S. Cloud, Wilmette, Ill.

Application November 10, 1950, Serial No. 195,046

11 Claims. (Cl. 107—54)

This invention relates to an improved method for manufacturing candy and more particularly a candy bar of a delicately crunchy nature, and which may be impregnated with a vegetable product, such as peanut butter.

Heretofore, it has been the practice in the manufacturing of candy bars somewhat similar to that resulting from the present invention to cook the candy syrup to a predetermined temperature, then allow it to cool and while still warm enough to be plastic to "pull" the cooked batch (which if left alone would cool as hard candy) to aerate it or impregnate it with air bubbles. This was usually done on a pulling machine. A vegetable flavoring matter, such as peanut butter has been distributed through the bar in between layers of pulled hard candy by flattening the pulled candy to a large pancake-like mass, then applying a layer of flavoring substance and folding over the two layers to maintain their relative positions and pulling the mass to mix them together and further impregnating the mass with air bubbles. This pulling was usually done by hand. Then the pulled layers of hard candy and flavoring substances were rolled up upon themselves to form a cylindrical batch and one end of this batch was pulled into a smaller cross section size and passed through sizing rollers, reducing the batch to a strip of approximately the desired cross section of the bar. The strips were then cut into uniform lengths, and usually coated with chocolate.

This method as above described, entails much labor and expense in the commercial production of such confections because of the number of separate steps which were employed. Furthermore, none of the methods heretofore known provided means not dependent on considerable skill and experience for reliably predetermining the characteristics of the resulting candy bar.

One object of the present invention is to provide a method and means for more economically producing a candy bar of the delicately crunchy type, which may incorporate vegetable flavoring, if desired.

Another object is to provide a method and means for producing an economical candy bar of the crunchy type but with some novel characteristics.

It is an object of this invention to provide a method and means for continuously and uniformly forming a bar from a cooked mass of hard candy by building up layers of threads of the candy, which threads have been stretched and congealed as separate threads to provide a special effect as to aeration and consistency.

It is another object of this invention to provide a method and means for making air-striated candy of predetermined, uniform crunchiness, by building up layers of threads of candy which vary in size according to the characteristics desired.

It is another object of this invention to provide a method and means for uniformly and at low labor cost flavoring candy with vegetable substances, such as peanut butter. This is accomplished by applying the flavoring matter between layers of threads of candy.

It is another object of this invention to provide a method and means for continuously forming strips of candy of any desired width which may be continuously cut or broken into pieces of any desired length.

It is still another object of this invention to provide a candy bar built up of alternate layers of threads of candy and peanut butter to produce a bar of crunchy, air-striated candy filled with peanut butter.

This application constitutes a continuation-in-part of my abandoned application, Serial Number 578,176, filed February 16, 1945.

In the drawings:

Figure 1 is a fragmentary view in side elevation of one side of the first part of an apparatus for carrying out the applicant's method.

Figure 2 is a view similar to Figure 1 of the remainder or final part of said apparatus.

Figure 3 is a fragmentary top plan view of the final part of the apparatus illustrating the separation of the sheet into candy bars.

Figure 4 is a fragmentary top view of one of the perforated pans.

Figure 5 is a fragmentary view in side elevation illustrating a modified form of the apparatus.

Figure 6 is a fragmentary top plan view of the final part of the structure of Figure 5, illustrating the formation of candy bars.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

In carrying out this invention, the candy, if cooked in a batch, is then placed in the steam kettle K and is maintained at a heat sufficient to flow through the pipes P, P¹, P², and P³ and to be delivered through nozzles N controlled by valves V. It is received in similar pans 1, one under each nozzle. The pans 1 are preferably rectangular in shape, open at the top, and have a plurality of perforations 2 in the bottom, preferably ⅛" in diameter and 16 holes to the square inch. The pans are supported an equal distance (about 8 inches having been found satisfactory) above a fabric belt conveyor 3 rotating about rolls 4, one end thereof passing over a smaller roll 5 at the right end as shown in Figure 2.

The candy retains heat of a sufficient degree to pass slowly through the perforations 2. Each string thus formed is drawn by gravity to a thin thread as it drops to the conveyor belt 3, which by its movement may somewhat lengthen the draw or pull of the candy threads. The threads pulled from successive transverse rows of perforations fall one upon the other to form a sheet of air-striated candy. This action seems to produce a physical structure similar to that resulting from pulling of candy on hooks in the candy pulling machine. The diameter of the threads pulled from the pan depends mainly upon the amount of cooking and the temperature of the holes, but may be varied by speed of travel of the belt. Upon increasing the speed of travel of the belt, the diameter of the threads decreases in proportion to the speed, other factors being constant. Therefore, by predetermining the speed of travel of the belt, the diameter of the threads may be predetermined. In a layer of candy pulled in this manner, the individual threads may be of uniform hardness, but by decreasing the diameter of the threads the apparent hardness of the bar will be decreased until the desired crunchy characteristic is obtained.

Preferably, air may be circulated through the duct 10 to be discharged through nozzles 11 below the pans 1 to cool the candy threads as drawn from the pan. Duct 10 may be extended and provided with additional nozzles 20 to further cool the candy threads beyond the area where the threads fall upon one another.

Flavoring matter, such as peanut butter, which does not volatilize from the heat of the candy is spread in a very thin layer on the layer of candy from each pan 1. Other vegetable flavorings may be used, such as chocolate paste which may be heated to a temperature sufficient to flow. The flavoring is forced by pump 6 through pipe 7 to vertical branches 8 depending therefrom between each of the pans 1 and provided with a flat nozzle 9 extending transversely of the belt 3. The length of the nozzles may be a distance equal to the width of the pans 1. They may be located at a slightly lesser distance above the surface of the belt 3 to spread the flavoring matter upon the upper surface of the layer of superimposed threads of candy. The flavoring matter may also be sprayed on. In any event it preferably sinks to some extent between the uppermost threads. The layer of threads on the belt travels from the first pan and receives its coating of flavoring matter; then as it passes under the next adjacent pan another layer of threads of candy will be superimposed upon the layer of flavoring matter and so on through the apparatus illustrated in Figures 1 and 2.

To some extent the threads contact one another through the thin layer of flavoring and weld the successive layers of threads together. Within each layer the threads stick together at many contact points. It is important, however, that before the threads come together they be congealed in the sense that they will approximately retain their cross-sections rather than flow together and losing their characteristics as individual threads.

Reasonably satisfactory results can be obtained by drawing the threads to a diameter of .01 inch. I prefer a diameter of .004 or even smaller. The smaller the diameter, the more important it becomes to keep the threads tacky enough to weld together at numerous contact points, lest the finished bar be too fragile to handle.

Any size desired can be approximated easily by trial, various factors being variable. The following data may be helpful. Using a candy temperature in the pans of 175° F. to 180° F., and a conveyor 12 inches below the pans and moving fifty feet per minute, a thread diameter of about .004" has been obtained. In this instance, the candy batch used included mainly fifteen pounds sugar to three pounds corn syrup, with flavoring to suit. Molasses is treated as flavoring, being used only in small proportions. The pans were as described, namely, ⅛" holes on ¼" centers. It is interesting to note that with thread about .004" diameter, a mile can be obtained from about an ounce and a half, and about 10,000 threads may be used in an ordinary candy bar.

Because the adjacent threads are substantially parallel, they lie snugly beside one another, and the density of the candy is satisfactorily high, the candy therefore being very different in texture from the ordinary spun candy commonly sold at carnivals.

The continuous layers of candy and flavoring matter as they travel on the belt beyond the last pan may be divided into strips, each of the width of the desired bar, and then cut into equal lengths corresponding to the length of the desired bar, either by the apparatus shown or any other desired means. Alternatively, the bars may be formed with their length lying transversely of the conveyor. As shown in Figs. 2 and 3, the layer of candy and flavoring matter passes under a rotor 12 arranged transversely of the belt and provided with a plurality of circumferential severing knives 13 equally spaced apart at a distance to divide the layer into strips of the width of the candy bar desired. These divided strips are then passed under another rotor 14 having a plurality of longitudinal scoring knives 15 equally spaced apart about the circumference of the rotor 14 at a distance equalling the length of the desired candy bar. As shown on the right hand end of Figure 2 these scored sections are discharged from the conveyor below, separate into individual candy bars by their own weight, and slide down an abutment 16 provided therefor to be received upon a conveyor belt, not shown, for further disposition.

It is to be understood that if bars without flavoring matter are desired they may be produced in a crunchy form by merely omitting the flavoring matter.

Figure 5 illustrates a modification of this invention in which a single pan and a single peanut butter nozzle is employed so that as the layer of candy threads impregnated with peanut butter is conveyed beyond the peanut butter nozzle, this layer encounters what may be termed a plow 17, which rolls the layer up upon itself to approximately the width and thickness of the desired candy bar. As shown in Figures 5 and 6, the plow 17 is positioned diagonally across the belt 3 and is bent back upon itself in a semi-circular form so that as the layer upon the belt engages the lower portion of the plow, continued movement in that direction causes the layer to roll up upon itself to form a strip similar to a jelly roll. After the strip has been formed, it may be passed under a rotor 18 having a plurality of scoring knives 19 equally spaced apart upon its circumference, approximately equalling the length of the desired candy bar.

If desired, instead of making a layer of candy threads and peanut butter continuously across the belt, separate strips of a width of the desired candy bar may be built up by spacing the holes 2 in the pan so that a layer of threads will be formed of the desired width, then a space, and then another layer of threads of similar width, and so on across the width of the pan, whereby layers of threads and peanut butter are built up which will form a strip approximately rectangular in cross section. This will do away with the rotor 12. If desired, the shape of the strips produced by this alternative method may be varied. For example, for forming a strip substantially pyramidal in cross-section the spaced holes would be progressively reduced in number beginning by eliminating those through which would flow the threads forming the edges of the strip.

Means may be provided for heating the candy in the pans 1, either to raise the temperature thereof or to offset heat losses. For example, an electric current can be passed evenly through the pan bottoms from side to side. This method of heating permits very rapid correction of the temperature of that part of the candy flowing through the holes 2.

This method of heating also lends itself to a modification of the invention in which ground hard candy is placed in the pans and gradually melted along the bottoms of the pans, the syrup thus melted flowing through the holes and being drawn, as heretofore described.

It will be observed that the candy threads are drawn by gravity, whether or not there is additional drawing by the movement of the conveyor. Perhaps the chief advantage of the gravity draw is that it lends itself to the provision of tens of thousands of holes, or even millions, if desired, without any difficulty in getting the process started. Gravity also provides a constant drawing force which facilitates detection of any variations in other factors so that uniform quality of output can more easily be maintained.

It will also be observed that the individual threads are solid, by which is meant that they are not hollow. Perhaps it should also be mentioned that the candy is preferably cooked sufficiently so that it will become brittle upon cooling and hardening.

I claim:

1. The method of making candy including flowing by gravity a bank of individual solid strings from a viscous mass of boiled, ready-to-congeal, threadable candy syrup, reducing the strings in diameter to thread-like character by gravity draw, congealing the threads separately, and diverting the threads to a laterally-extending plane so as to superimpose the individual threads on one another to form a continuous laminated layer of candy stock.

2. The method of making candy including flowing by gravity a bank of individual solid strings from a viscous mass of boiled, ready-to-congeal, threadable candy syrup, reducing the strings in diameter to thread-like character by gravity draw, congealing the threads separately, diverting the threads to a laterally-extending plane so as to superimpose the individual threads on one another to form a continuous laminated layer of candy stock, and cutting the layer into predetermined sizes.

3. Apparatus for making candy including container means having a stationary bottom perforated with multitudinous holes for permitting the flow by gravity of a bank of individual solid strings from a viscous mass of boiled, ready-to-congeal candy syrup, and moving support means spaced below the perforated bottom to receive the strings after a fall by gravity draws the strings to smaller thread-like diameter and to divert the movement of the threads laterally so as to superimpose the individual threads on one another to form a continuous laminated layer of candy stock, the said spacing being such as to permit separate congealing of the threads.

4. The method of making candy including flowing by gravity a bank of individual solid strings from a viscous mass of boiled, read-to-congeal, threadable candy syrup, reducing the strings in diameter to at least as small as .01 inch by gravity draw, congealing the threads separately, and diverting the threads to a laterally-extending plane so as to superimpose the individual threads on one another to form a continuous laminated layer of candy stock.

5. The method of making candy including flowing by gravity a bank of individual solid strings from a viscous mass of boiled, ready-to-congeal, threadable candy syrup, reducing the strings in diameter to at least as small as approximately .004 inch by gravity draw, congealing the threads separately, and diverting the threads to a laterally-extending plane so as to superimpose the individual threads on one another to form a continuous laminated layer of candy stock.

6. The method of making candy including flowing by gravity a bank of individual solid strings from a viscous mass of boiled, ready-to-congeal, threadable candy syrup, reducing the strings in diameter to at least as small as .01 inch by gravity draw, congealing the threads separately, and diverting the threads to a laterally-extending plane so as to superimpose the individual threads on one another to form a continuous laminated layer of candy stock and dividing the layer into predetermined sizes.

7. The method of making candy including flowing by gravity a bank of individual solid strings from a viscous mass of boiled, ready-to-congeal, threadable candy syrup, reducing the strings in diameter to at least as small as approximately .004 inch by gravity draw, congealing the threads separately, and diverting the threads to a laterally-extending plane so as to superimpose the individual threads on one another to form a continuous laminated layer of candy and dividing the layer into predetermined sizes.

8. The method of making candy including flowing a bank of individual solid strings from a viscous mass of boiled, ready-to-congeal, threadable candy syrup, drawing the strings to a diameter at least as small as .01 inch, congealing the threads separately to a point at which they retain their separate cross-sectional identities but weld together where they contact one another, and superimposing the individual threads in parallelism upon one another to form a continuous laminated layer of candy stock.

9. The method of making candy including flowing a bank of individual solid strings from a viscous mass of boiled, ready-to-congeal, threadable candy syrup, drawing the strings to a diameter at least as small as approximately .004 inch, congealing the threads separately to a point at which they retain their separate cross-sectional identities but weld together where they contact one another, and superimposing the individual threads in parallelism upon one another to form a continuous laminated layer of candy stock.

10. The method of making candy including flowing a bank of individual solid strings from a viscous mass of boiled, ready-to-congeal, threadable candy syrup, drawing the strings to a diameter at least as small as .01 inch, congealing the threads separately to a point at which they retain their separate cross-sectional identities but weld together where they contact one another, superimposing the individual threads in parallelism upon one another to form a continuous laminated layer of candy stock, and intermingling separate flavoring matter among the threads.

11. The method of making candy including flowing a bank of individual solid strings from a viscous mass of boiled, ready-to-congeal, threadable candy syrup, drawing the strings to a diameter at least as small as approximately .004 inch, congealing the threads separately to a point at which they retain their separate cross-sectional identities but weld together where they contact one another, superimposing the individual threads in parallelism upon one another to form a continuous laminated layer of candy stock, and intermingling separate flavoring matter among the threads.

WILLIAM S. CLOUD.

References Cited in the file of this patent

UNITED STATES PATENTS

| Number | Name | Date |
|---|---|---|
| 1,393,144 | Laskey | Oct. 11, 1921 |
| 1,576,339 | Laskey | Mar. 9, 1926 |
| 1,778,537 | Steely | Oct. 14, 1930 |
| 1,906,069 | Laskey | Apr. 25, 1933 |
| 2,132,690 | Hilliard | Oct. 11, 1938 |
| 2,175,214 | Robinson et al. | Oct. 10, 1939 |